United States Patent
Klein et al.

(10) Patent No.: US 10,248,224 B2
(45) Date of Patent: Apr. 2, 2019

(54) INPUT BASED ON INTERACTIONS WITH A PHYSICAL HINGE

(71) Applicant: Microsoft Technology Licensing, LLC, Redmond, WA (US)

(72) Inventors: Christian Klein, Duvall, WA (US); Raymond Quan, Seattle, WA (US); Ricardo A. Espinoza Reyes, Redmond, WA (US); Gregg Robert Wygonik, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 15/333,814

(22) Filed: Oct. 25, 2016

(65) Prior Publication Data

US 2018/0113520 A1 Apr. 26, 2018

(51) Int. Cl.
*G06F 3/0338* (2013.01)
*G06F 1/16* (2006.01)
*G06F 3/0346* (2013.01)
*G06F 3/038* (2013.01)

(52) U.S. Cl.
CPC .......... *G06F 3/0338* (2013.01); *G06F 1/1641* (2013.01); *G06F 1/1677* (2013.01); *G06F 1/1681* (2013.01); *G06F 1/1694* (2013.01); *G06F 3/038* (2013.01); *G06F 3/0346* (2013.01); *G06F 2200/1636* (2013.01); *G06F 2200/1637* (2013.01); *G06F 2203/04803* (2013.01)

(58) Field of Classification Search
CPC ...... G06F 3/0338; G06F 3/0346; G06F 3/038; G06F 1/1641; G06F 1/1681
See application file for complete search history.

(56) References Cited

U.S. PATENT DOCUMENTS

| 7,433,179 | B2 | 10/2008 | Hisano et al. |
| 7,456,823 | B2 | 11/2008 | Poupyrev et al. |
| 8,803,816 | B2 | 8/2014 | Kilpatrick, II et al. |
| 8,890,802 | B2 | 11/2014 | Case, Jr. et al. |
| 9,183,770 | B2 | 11/2015 | Lee et al. |

(Continued)

FOREIGN PATENT DOCUMENTS

EP  2720132 A2  4/2014

OTHER PUBLICATIONS

Khalilbeigi, et al., "FoldMe: Interacting with Double-sided Foldable Displays", In Proceedings of Sixth International Conference on Tangible, Embedded and Embodied Interaction, Feb. 19, 2012, pp. 33-40.

(Continued)

*Primary Examiner* — Ricardo L Osorio

(57) ABSTRACT

Techniques for input based on interactions with a physical hinge are described. Generally, a new class of interactions involves user manipulation of a physical hinge in order to provide input to a computing device. These hinge-based interactions provide input to a computing system that can be leveraged to initiate one or more system-level commands or operations, initiate transitions between discrete views of content, interact with content displayed via one or more display devices, and so on. In an example, a sequence of two or more consecutive hinge angle changes is recognized as a hinge gesture to perform a particular operation, such as a transition between a single-tasking state and a multitasking state.

20 Claims, 13 Drawing Sheets

(56) References Cited

U.S. PATENT DOCUMENTS

| | | | |
|---|---|---|---|
| 9,317,198 B2 | 4/2016 | Kwak et al. | |
| 2005/0083351 A1* | 4/2005 | Kawamoto | H04M 1/021 345/660 |
| 2005/0282596 A1* | 12/2005 | Park | H04M 1/021 455/575.3 |
| 2010/0182265 A1 | 7/2010 | Kim et al. | |
| 2011/0179864 A1 | 7/2011 | Raasgh et al. | |
| 2012/0026681 A1 | 2/2012 | Wang et al. | |
| 2013/0169564 A1* | 7/2013 | Sano | G06F 1/1647 345/173 |
| 2013/0181902 A1 | 7/2013 | Hinckley et al. | |
| 2013/0205142 A1 | 8/2013 | Jung | |
| 2013/0249873 A1* | 9/2013 | Zhang | G09G 3/22 345/204 |
| 2013/0321340 A1* | 12/2013 | Seo | G06F 1/1641 345/174 |
| 2014/0082534 A1 | 3/2014 | Cleron et al. | |
| 2014/0101575 A1* | 4/2014 | Kwak | G06F 1/1616 715/761 |
| 2014/0101578 A1* | 4/2014 | Kwak | G06F 3/017 715/761 |
| 2015/0116364 A1 | 4/2015 | Aurongzeb et al. | |
| 2015/0205946 A1* | 7/2015 | Aurongzeb | G06F 21/36 726/19 |
| 2015/0220299 A1 | 8/2015 | Kim et al. | |
| 2015/0227223 A1 | 8/2015 | Kang et al. | |
| 2015/0227224 A1* | 8/2015 | Park | G06F 3/0487 345/173 |
| 2015/0227225 A1* | 8/2015 | Park | G06F 1/1641 345/173 |
| 2015/0227249 A1* | 8/2015 | Kim | H04M 1/0214 345/173 |
| 2015/0277600 A1 | 10/2015 | Mizunuma et al. | |
| 2015/0378557 A1* | 12/2015 | Jeong | G06F 3/0488 715/835 |
| 2016/0098063 A1* | 4/2016 | Lee | G06F 1/1641 345/659 |
| 2016/0187938 A1* | 6/2016 | Han | G06F 1/1684 361/679.27 |

OTHER PUBLICATIONS

Hinckley, et al., "Codex: A Dual-Screen Tablet Computer", In Proceedings of the Special Interest Group on Computer—Human Interaction Conference on Human Factors in Computing Systems, Apr. 9, 2009, pp. 1933-1942.

"International Search Report and Written Opinion Issued in PCT Application No. PCT/US2017/055818", dated Jan. 24, 2018, 13 Pages.

* cited by examiner

INPUT BASED ON INTERACTIONS WITH A PHYSICAL HINGE

BACKGROUND

Mobile devices provide today's user with a variety of different functionalities, and in many instances allow the user to directly interact with objects displayed via touch-sensitive display devices. Devices having multiple display surfaces connected by a hinge, however, introduce complexities that are typically not resolved using conventional gesture input modalities.

Consequently, a typical gesture language may be inefficient for these devices given the ergonomics of holding and interacting with such a device. This can detract from user enjoyment and lead to user frustration when using these types of devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for input based on interactions with a physical hinge are described. Generally, a new class of interactions involves user manipulation of a physical hinge in order to provide input to a computing device. These hinge-based interactions provide input to a computing system that can be leveraged to initiate one or more system-level commands and/or operations, initiate transitions between discrete views of content, interact with content displayed via one or more display devices, and so on. In an example, a sequence of two or more consecutive hinge angle changes is recognized as a hinge gesture to perform a particular operation, such as a transition between a single-tasking state and a multitasking state.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques for input based on interactions with a physical hinge are described. Generally, techniques described herein provide a new class of interactions involving user manipulation of a physical hinge to provide input to a computing device. In implementations, these interactions allow users to initiate a variety of multitasking interactions that use at least two different displays. In one or more implementations, the techniques described herein provide a streamlined and elegant way for a user to provide multitasking-related commands to a system to perform actions such as to transition between multitasking and non-multitasking scenarios.

Leveraging a hinge connecting multiple displays, devices described herein enable a range of interaction models that take advantage of the hinge. In some implementations, interactions with the hinge can be combined with one or more additional input signals to modify an operation associated with the hinge interaction. These additional input signals can include a variety of different input signals, such as an indication of an orientation of the device, a velocity at which the hinge interaction is performed, touch signals indicating how the user is holding the device, and so on. Accordingly, a variety of different input signals can be combined with the hinge interaction to modify the operation associated with the hinge interaction.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures"

describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
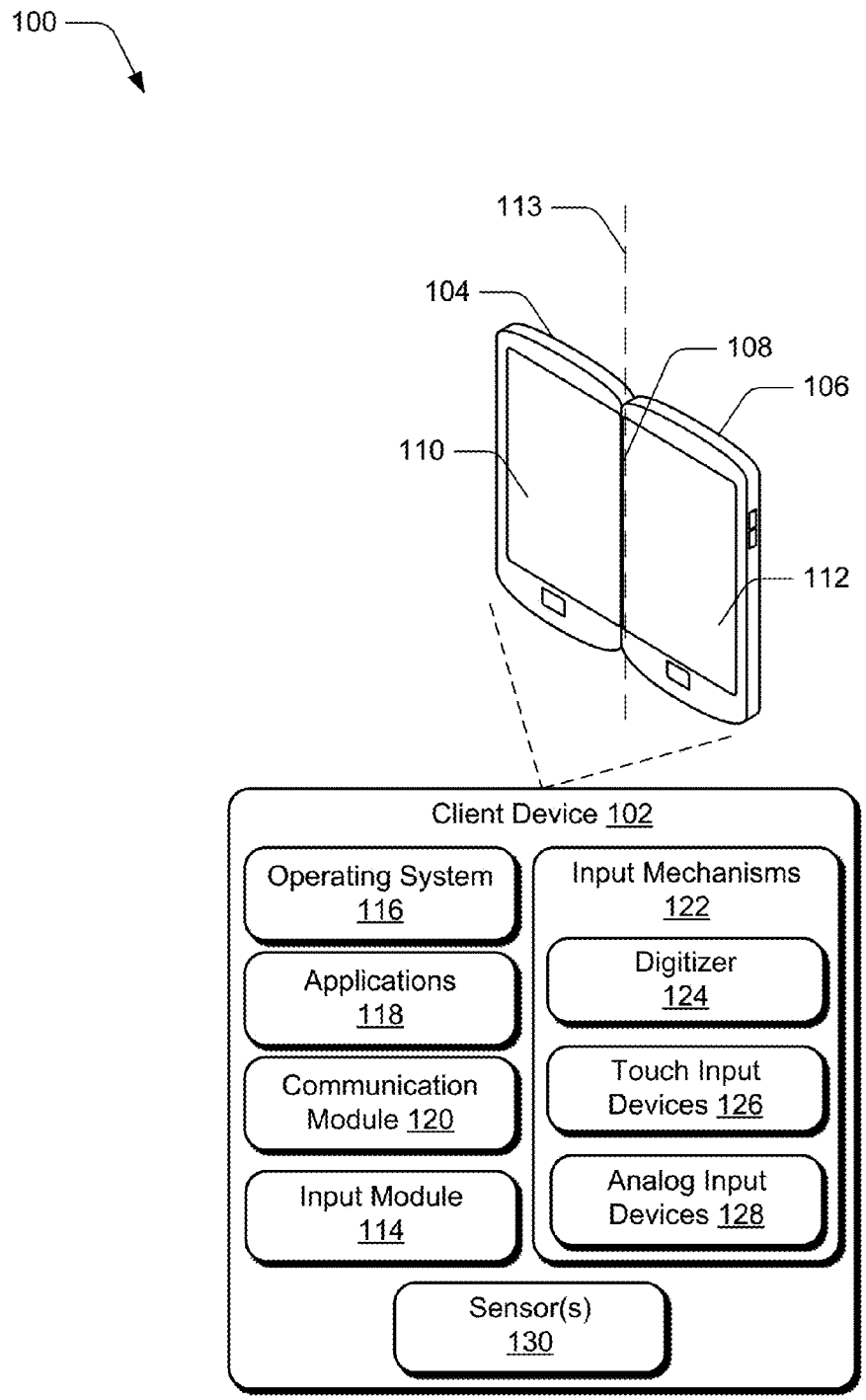
FIG. 1 is an illustration of an environment in an example implementation that is operable to employ the techniques described herein in accordance with one or more embodiments.

FIG. 1 is an illustration of an environment 100 in an example implementation that is operable to employ techniques for input based on interactions with a physical hinge discussed herein. Environment 100 includes a client device 102 which can be configured for mobile use, such as a mobile phone, a tablet computer, a wearable device, a handheld gaming device, a media player, and so on. The client device 102 includes a display device 104 and a display device 106 that are connected to one another by a hinge 108. The display device 104 includes a touch surface 110, and the display device 106 includes a touch surface 112. The client device 102 also includes an input module 114 configured to process input received via one of the touch surfaces 110, 112 and/or via the hinge 108.

The hinge 108 is configured to rotationally move about a longitudinal axis 113 of the hinge 108 to allow an angle between the display devices 104, 106 to change. In this way, the hinge allows the display devices 104, 106 to be connected to one another yet be oriented at different angles and/or planar orientations relative to each other. In at least some implementations, the touch surfaces 110, 112 may represent different portions of a single integrated display that can be bent along the hinge 108.

While implementations presented herein are discussed in the context of a mobile device, it is to be appreciated that various other types and form factors of devices may be utilized in accordance with the claimed implementations. Thus, the client device 102 may range from full resource devices with substantial memory and processor resources, to a low-resource device with limited memory and/or processing resources. An example implementation of the client device 102 is discussed below with reference to FIG. 13.

The client device 102 includes a variety of different functionalities that enable various activities and tasks to be performed. For instance, the client device 102 includes an operating system 116, applications 118, and a communication module 120. Generally, the operating system 116 is representative of functionality for abstracting various system components of the client device 102, such as hardware, kernel-level modules and services, and so forth. The operating system 116, for instance, can abstract various components (e.g., hardware, software, and firmware) of the client device 102 to enable interaction between the components and applications running on the client device 102.

The applications 118 are representative of functionality for performing different tasks via the client device 102. In one particular implementation, the applications 118 represent a web browser, web platform, or other application that can be leveraged to browse websites over a network.

The communication module 120 is representative of functionality for enabling the client device 102 to communicate over wired and/or wireless connections. For instance, the communication module 120 represents hardware and logic for communicating data via a variety of different wired and/or wireless technologies and protocols.

According to various implementations, the display devices 104, 106 generally represent functionality for visual output for the client device 102. Additionally, the display devices 104, 106 represent functionality for receiving various types of input, such as touch input, pen input, touchless proximity input, and so forth via one or more of the touch surfaces 110, 112. The input module 114 is representative of functionality to enable the client device 102 to receive input (e.g., via input mechanisms 122) and to process and route the input in various ways.

The input mechanisms 122 generally represent different functionalities for receiving input to the client device 102, and include a digitizer 124, touch input devices 126, and analog input devices 128. Examples of the input mechanisms 122 include gesture-sensitive sensors and devices (e.g., such as touch-based sensors), a stylus, a touch pad, accelerometers, a microphone with accompanying voice recognition software, and so forth. The input mechanisms 122 may be separate or integral with the display devices 104, 106; integral examples include gesture-sensitive displays with integrated touch-sensitive sensors.

The digitizer 124 represents functionality for converting various types of input to the display devices 104, 106, the touch input devices 126, and the analog input devices 128 into digital data that can be used by the client device 102 in various ways. The analog input devices 128 represent hardware mechanisms (e.g., the hinge 108) that are usable to generate different physical quantities that represent data. For instance, the hinge 108 represents a mechanism that can be leveraged to generate input data by measurement of a physical variable, such as hinge angle of the hinge 108. One or more sensors can measure the hinge angle, and the digitizer 124 can convert such measurements into digital data usable by the client device 102 to perform operations to content displayed via the display devices 104, 106.

The client device 102 further includes sensors 130 configured to detect different input signals received by the client device 102. For example, the sensors 130 can include one or more hinge sensors configured to detect a hinge angle between the display devices 104, 106. Additionally, the sensors 130 can include grip sensors, such as touch sensors, configured to detect how a user is holding the client device 102. In implementations, the sensors may include accelerometers to detect an orientation of the client device 102 in space, or relative to gravity or a user. Additionally or alternatively, the sensors 130 can detect a velocity associated with movement (e.g., opening and closing) of the hinge 108. Accordingly, a variety of different sensors 130 can be implemented to detect various different types of digital and/or analog input. These and other aspects are discussed in further detail below.

Having described an example environment in which the techniques described herein may operate, consider now a discussion of some example implementation scenarios in accordance with one or more implementations.

Example Implementation Scenarios

This section describes some example implementation scenarios for input based on interactions with a physical hinge in accordance with one or more implementations. The implementation scenarios may be implemented in the environment 100 described above, the system 1300 of FIG. 13, and/or any other suitable environment. The implementation scenarios and procedures, for example, describe example operations of the client device 102.

Figure 2:
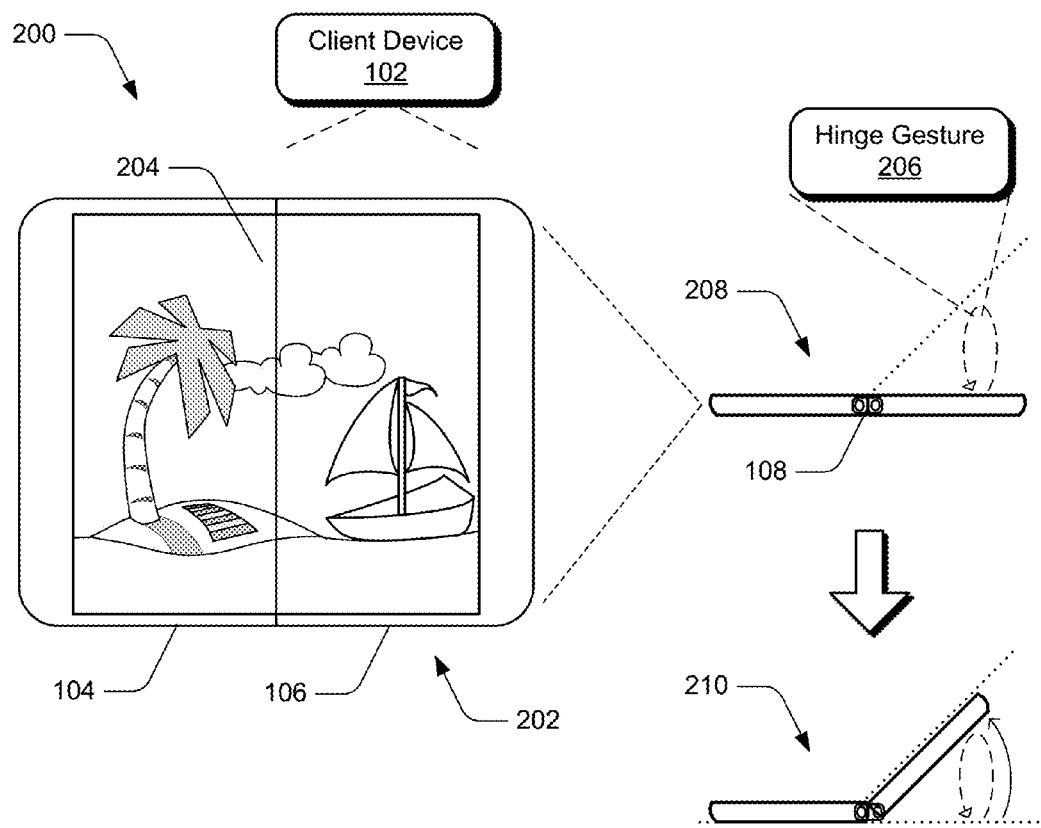
FIG. 2 depicts an example implementation scenario for input based on interactions with a physical hinge in accordance with one or more embodiments.
Figure 2:
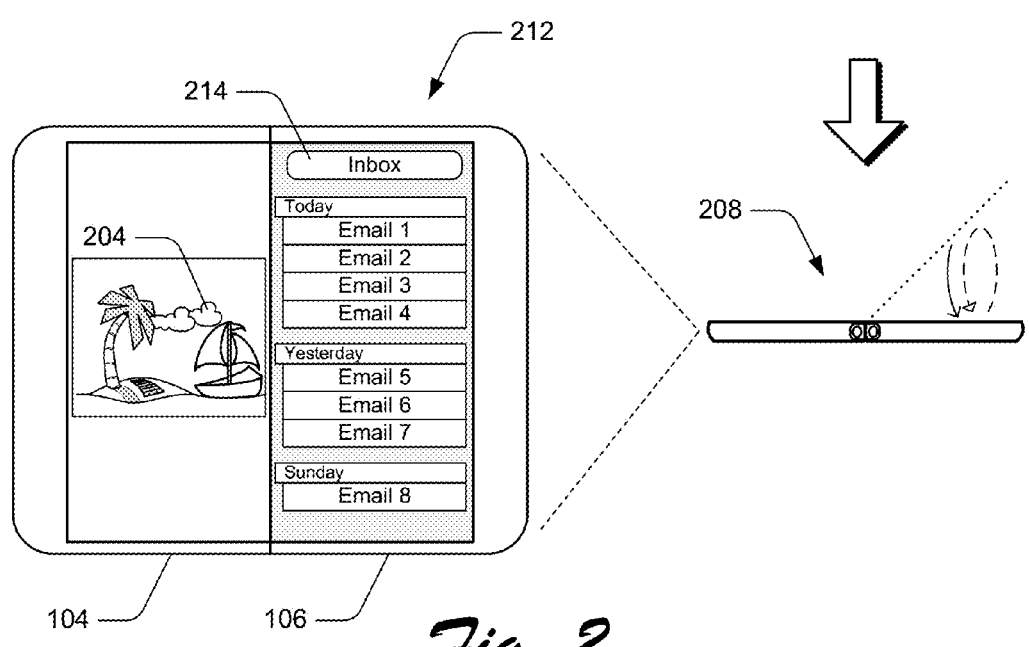

FIG. 2 depicts an example implementation scenario 200 for input based on interactions with a physical hinge in accordance with one or more implementations. The scenario 200 represents a form of input that allows a user to perform a variety of multitasking interactions via the client device 102. In the scenario 200, the client device 102 is being used in a single-tasking state 202 to display media content 204 of a single application 118 via both display devices 104, 106. For example, a left half of the media content 204 is displayed via the display device 104 while a right half of the media content 204 is displayed via the display device 106. Alternatively, the single-tasking state 202 can utilize one display while the other display is turned off.

Further to the scenario 200, a user interacts with the client device 102 to cause the hinge 108 to move in a back-and-forth motion to perform a hinge gesture 206. For example, in the upper portion of the scenario 200, the client device 102 is initially in a flat state 208 in which both display devices 104, 106 are positioned side by side and face the same direction, i.e., are co-planar. The user then transitions the client device 102 from the flat state 208 to a bent state 210 by applying force to at least one of the display devices 104, 106 to cause the hinge 108 to bend. In the bent state 210, the display devices 104, 106 at least partially face toward one another, such that the client device 102 is in a partially closed orientation.

Continuing with the scenario 200, within a predefined duration of time (e.g., within one or two seconds from the client device 102 being transitioned from the flat state 208 to the bent state 210), the user interacts with the client device 102 to transition the client device 102 from the bent state 210 back to the flat state 208. In at least one implementation, the hinge gesture 206 represents a back-and-forth snapping or popping based on manipulation of the hinge 108.

In at least one implementation, the hinge gesture 206 represents a system gesture that is recognized globally at a system level. In this way, the operating system 116, rather than a foreground application 118, detects the hinge gesture 206. Because the hinge gesture 206 is handled globally by the system (e.g., the operating system 116), the hinge gesture 206 can be recognized while running any of a variety of different arbitrary applications that are not specifically configured to receive input via hinge interactions. Accordingly, the client device 102 can recognize the hinge gesture 108 regardless of which application is currently running because the hinge gesture 206 is recognized globally at the system level.

In the scenario 200, the system detects the hinge gesture 206 and transitions from the single-tasking state 202 to a multitasking state 212, which allows multiple tasks to be performed concurrently. In this way, the client device 102 transitions from a state using both display devices 104, 106 as a single integrated display to a state using the two display devices 104, 106 independently from one another. In the multitasking state, for instance, the media content 204 that was previously displayed via both display devices 104, 106 is repositioned to the display device 104, and a new user interface 214 is launched via the display device 106. Accordingly, the new user interface 214 and the media content 204 are displayed side by side.

In the scenario 200, the new user interface 214 represents an email user interface, which is not directly related to the media content 204. This is not to be construed as limiting, and in other implementations the user interface 214 represents a web browser, a piece of a shell user interface, a digital agent, or another application that provides information directly related to the media content 204 being displayed via the display device 104.

In at least some implementations, the new user interface 214 and the media content 204 can include different views within a same experience, such as a master-detail view. For example, in an email client, one view can show a list of emails while the other view shows a preview of a particular email or an editing canvas to type a new email. Another example includes showing a list of folders, categories, or filters via the display device 104, and displaying via the display device 106 a list of search results or items in a folder selected from the display device 104. Accordingly, the hinge gesture 206 can initiate display of an application that was not previously running, and can select a most-likely application or user interface that is contextually related to a previously running application. In other examples, the new user interface 214 can be a system or shell user interface (e.g., a start menu), or an application such as an email client, a web browser, a word processor, or other application that is not directly related to the media content 204 or a currently running application.

In one or more implementations, the transition from the single-tasking state 202 to the multitasking state 212 can return to a most recent multitasking context. For example, if an email client was previously running next to a movie in the multitasking state 212 and subsequently the movie was running in the single-tasking state 202, then the hinge gesture 206 causes the email client to be brought back onto one of the display devices 104, 106 in the multitasking state 212.

Figure 3:
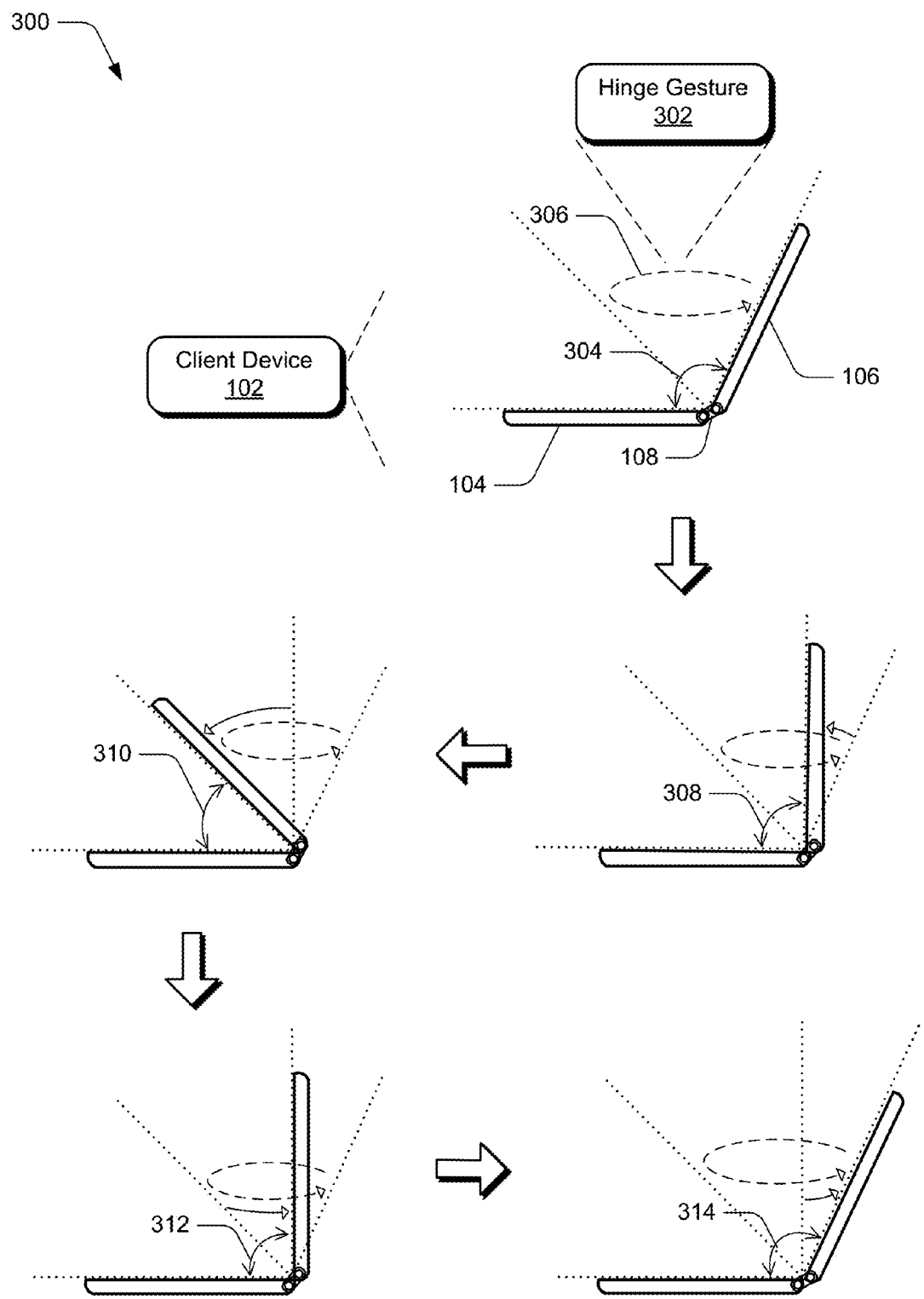
FIG. 3 depicts an example implementation scenario representing a hinge gesture being performed based on interactions with a physical hinge in accordance with one or more embodiments.

FIG. 3 depicts an example implementation scenario 300 representing a hinge gesture being performed based on interactions with a physical hinge in accordance with one or more implementations. The scenario 300 illustrates an example hinge gesture 302, which represents a sequence of two or more consecutive hinge angle changes between two displays of a device. The device discussed in the scenario 300, for instance, represents an instance of the client device 102.

For example, a device, such as client device 102 includes a display device 104 and a display device 106 connected together by a physical hinge 108. Initially, the client device 102 is oriented such that a measurable hinge angle 304 exists between the display device 104 and the display device 106. The hinge angle 304 is recorded as an initial angle for the hinge gesture 302.

In one or more implementations, the hinge gesture 302, represented by arrow 306, can be performed by manipulating the hinge 108 in a back-and-forth motion. The example scenario 300 illustrates a progression from an initial position of the hinge angle 304 through an angle 308 to a new angle 310, and back through an angle 312 to an angle 314. For example, the hinge angle 304 is changed by rotatably moving the display device 106 about the hinge 108. In at least some implementations, the hinge angle change can be based on continuous or intermittent movement of the hinge 108. For example, the display device 106 can be moved about the hinge 108 intermittently by changing the hinge angle from the initial position of the hinge angle 304 to the new angle 310. Subsequently, the display device 106 can be moved to change the hinge angle from the new angle 310 to angle 312, and then to angle 314. In at least some implementations, the angle 312 is substantially the same as the angle 308 (e.g., within +/−10°), and the angle 314 is substantially the same as the angle 304 (e.g., within +/−10°).

This is not to be construed as limiting, and in other implementations, the display device 106 can be rotatably moved about the hinge 108 in a continuous motion, such that the hinge angle changes directly from the initial position of the hinge angle 304 to the new angle 310, and then back to return to its approximate original position, or to a final angle (e.g., angle 314) that is within a range of the initial position of the hinge angle 304. Accordingly, the hinge gesture 302 is recognized as at least two consecutive hinge angle changes. While the illustration includes two consecutive hinge angle changes, any number of plural consecutive changes to the hinge angle can be used to perform the hinge gesture 302.

Figure 4:
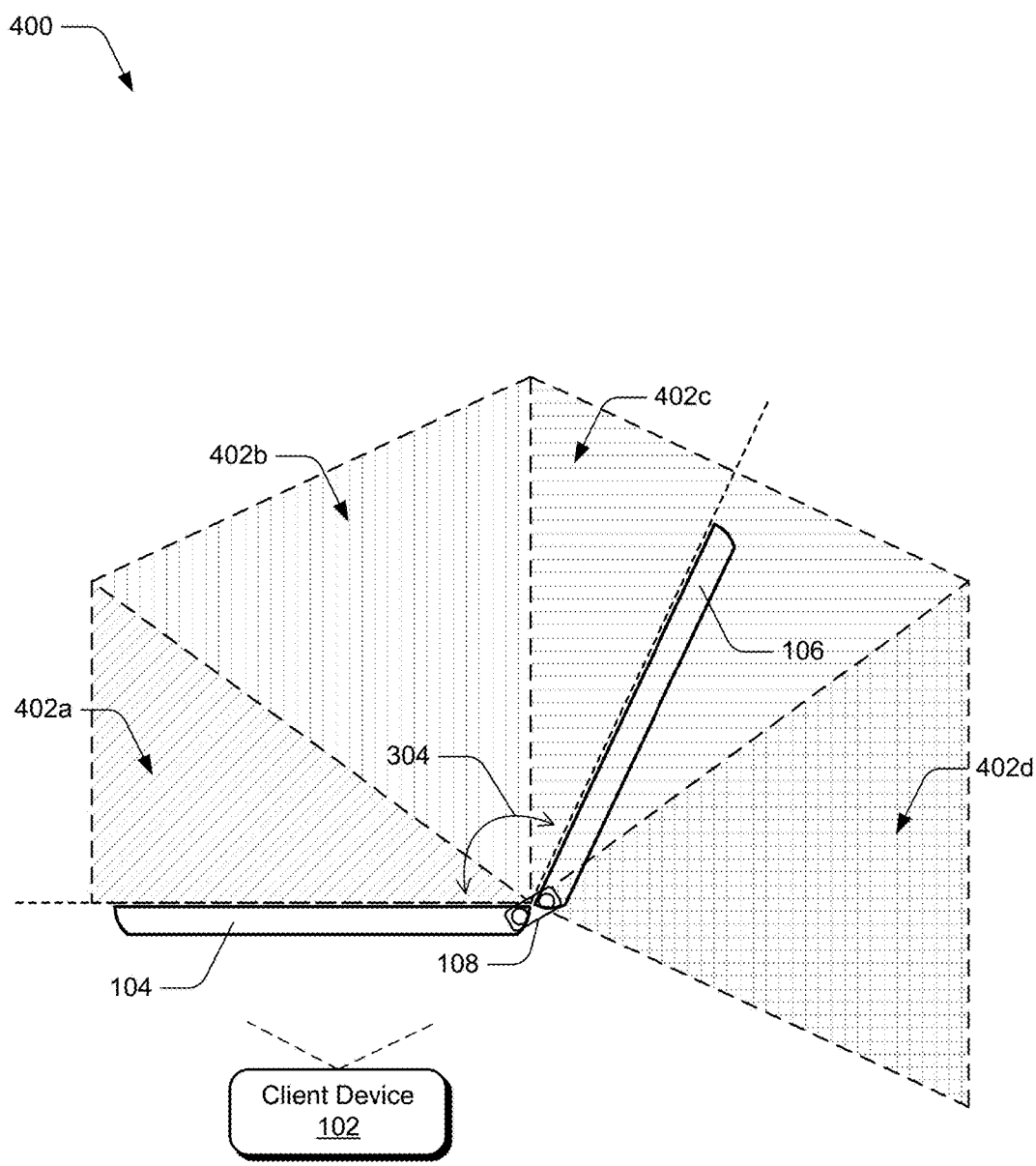
FIG. 4 depicts an example implementation scenario for angle ranges of a physical hinge mapped to different states in accordance with one or more embodiments.

FIG. 4 depicts an example implementation scenario 400 for angle ranges of a physical hinge mapped to different states in accordance with one or more embodiments. For example, the scenario 400 includes the client device 102 with a variety of different available angle ranges 402a, 402b, 402c, and 402d (each illustrated by hash lines) for the hinge angle 304. These example angle ranges are not to be construed as limiting, and any number of angle ranges can be implemented. Additional angle ranges including angles between 180 degrees and 360 degrees can also be utilized. In at least one implementation, each angle range 402a-402dd can be mapped to a different user interface state to enable switching between different views of a user interface or content by changing the hinge angle 304 to an angle corresponding to a particular range. For example, as a user manipulates the display devices 104, 106 relative to one another such that the hinge 108 pivots between different hinge angles, the user interface cycles through the different views. The hinge angle 304, for example, can be detected by the sensors 130 that detect a current angle of the hinge 108 with respect to the display devices 104, 106. For instance, the sensors 130 can be disposed on one or both display devices 104, 106 of the client device 102, and can include orientation sensors such as accelerometers or other sensors that are used to compute the hinge angle 304 and/or other hinge angles based on orientation in space (e.g., with respect to gravity) of the display devices 104, 106 of the client device 102.

Figure 5:
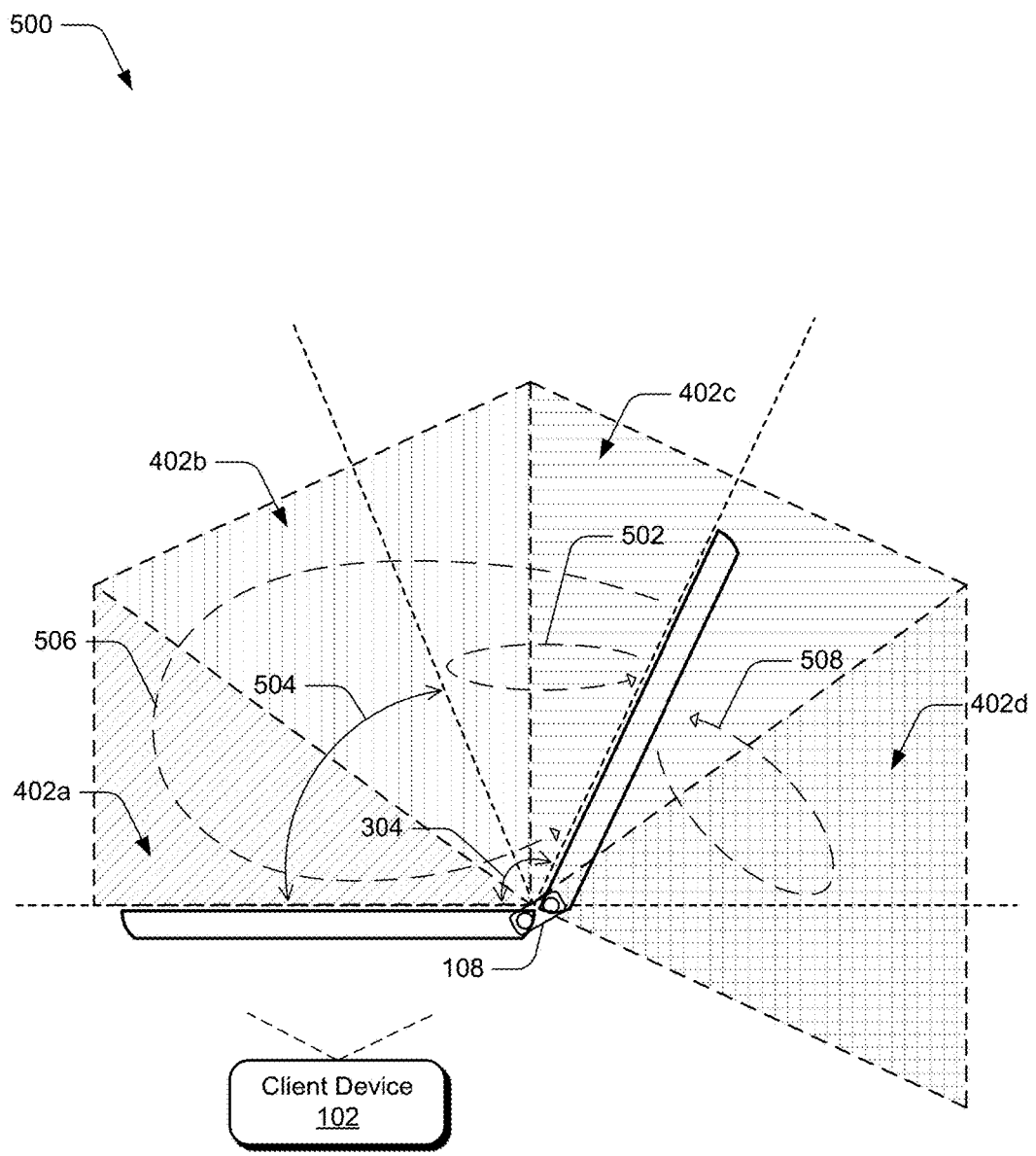
FIG. 5 depicts an example implementation scenario for input based on interactions with a physical hinge in accordance with one or more embodiments.

Combining the scenario 300 with the scenario 400 extends the usability and functionality of hinge gestures as is illustrated in FIG. 5. For instance, FIG. 5 depicts an example implementation scenario 500 for input based on interactions with a physical hinge in accordance with one or more embodiments. In the scenario 500, the client device 102 is illustrated as including the multiple different ranges 402a-402d with which to perform the hinge gesture 302, where each range of the hinge gesture 302 is mapped to a different operation or a different user interface state. For example, assume that the client device 102 is being used in the illustrated bent orientation having the hinge angle 304 of approximately 120 degrees, which is within range 402c. A first hinge gesture 502 can be performed by performing two relatively small changes to the hinge angle 304, such as thirty degree changes, which forms a new hinge angle 504 that is within range 402b and then returns the hinge angle 304 to an angle within range 402c. This hinge gesture 502 can be mapped to a first function or a first UI state. However, a hinge gesture 506 having relatively larger changes to the hinge angle 304, such as a change that forms a new angle within range 402a (e.g., substantially closed orientation) and then returns to an angle that is within range 402c, can be mapped to a second function or second UI state.

While the hinge gesture 506 is generally described as a motion that first at least partially closes the client device 102 and then at least partially opens the client device 102, this is not to be construed as limiting. It is also contemplated, for example, that the hinge gesture 506 can be performed by first performing an opening motion and then a partial closing motion, such as hinge gesture 508 which forms an angle that is within the range 402d and then returns to an angle that is within the range 402c. Accordingly, the hinge gesture 506 can be mapped to a variety of different UI states or functions based on which angle range includes the initial position of the hinge angle 304 and/or to which angle range the hinge gesture 302 transitions.

In addition, a variety of additional input signals can be combined with the movement of the hinge to modify or refine a hinge gesture, and enable additional interpretations. For example, combining a first set of input signals with a hinge gesture can launch a contextually related application, while combining a different set of input signals with the hinge gesture can initiate a master-detail view within a same application. Different types of multitasking interactions, for instance, may be available based on different input signals combined with a hinge gesture. In at least some implementations, these additional signals can include, but are not limited to, a velocity with which a hinge gesture is performed, orientation of the client device 102, and grip signals indicating how the user is holding the client device 102. Examples of such input signals are discussed in further detail with respect to FIGS. 6-8.

Figure 6:
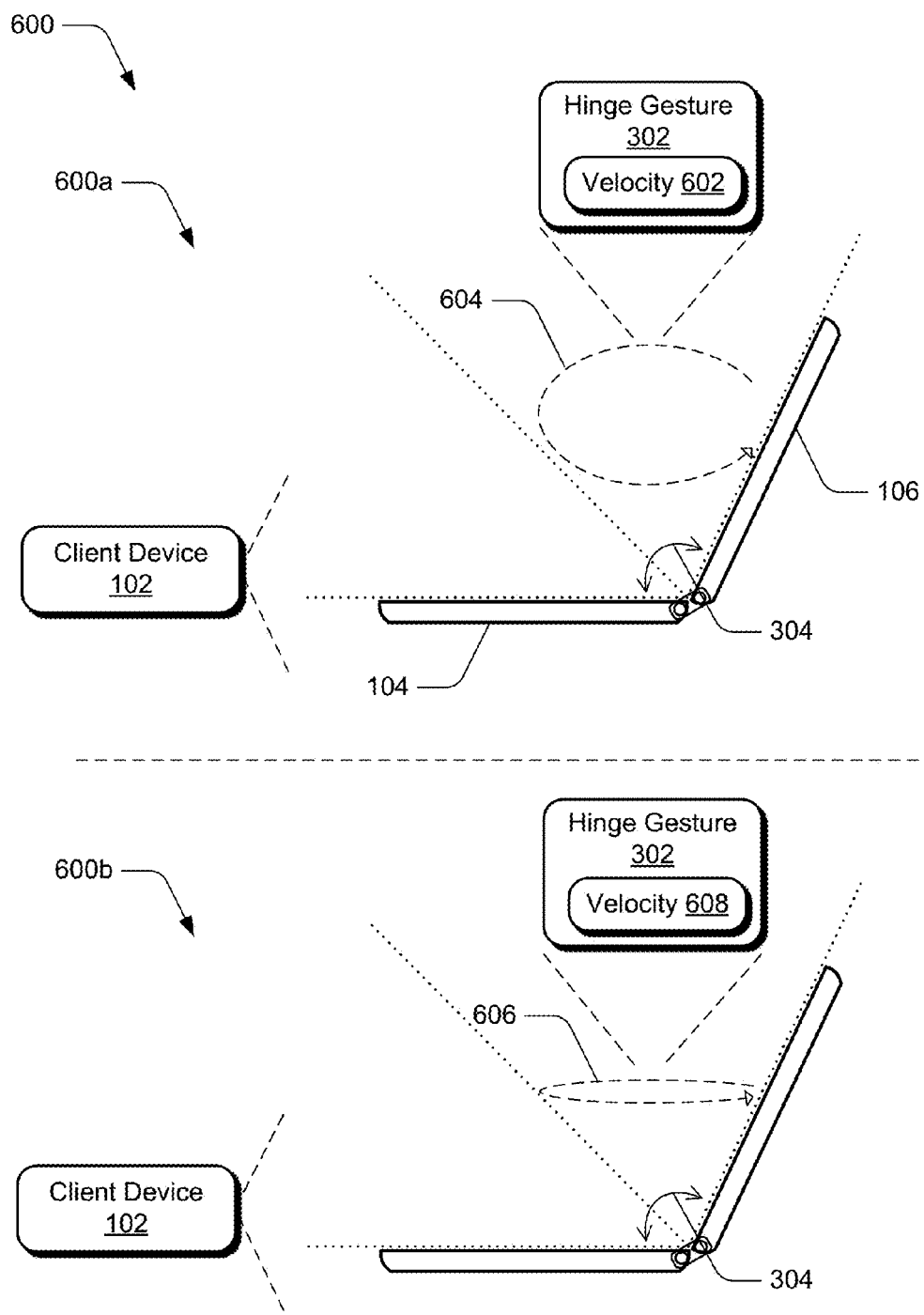
FIG. 6 depicts example implementation scenarios for a multimodal combination of a hinge interaction with an additional input modality in accordance with one or more embodiments.

FIG. 6 depicts example implementation scenarios 600 for a multimodal combination of a hinge interaction with an additional input modality in accordance with one or more embodiments. When the hinge gesture 302 is recognized, the system determines a velocity 602 associated with the movement of the hinge 108. For example, in scenario 600a, the hinge gesture 302 is performed relatively slowly, and is represented by arrow 604 having a circular shape. The velocity 602 is determined to be below a particular threshold velocity value or within a particular velocity range. Thus, the velocity 602 can be combined with the changes to the hinge angle 304 to map the hinge gesture 302 to a particular function. Generally, velocity of movement of the hinge 108 can be determined in various ways, such as by using one or more accelerometers to detect a rate of change of the hinge angle between the displays devices 104, 106. In implementations, the one or more accelerometers are used to detect an acceleration or deceleration of the movement of the hinge over a period of time. Further, the velocity can be detected over a period of time to determine various aspects of the velocity, such as an average velocity, a maximum velocity, a variability of the velocity, and so on, any of which can be used to modify the hinge gesture 302 to perform a particular function. In at least some implementations, the accelerometers can be located in one or both display devices 104, 106 to detect movement of the display devices 104, 106 relative to one another.

In contrast, scenario 600b illustrates the hinge gesture 302 being performed relatively quickly, and is represented by arrow 606 having a narrow oval shape. In the scenario 600b, the hinge gesture 302 has a velocity 608 that is above the particular threshold velocity value or within a particular velocity range. Thus, in this particular scenario, the gesture 302 at the velocity 608 can be combined with the changes to the hinge angle 304 to map the hinge gesture 302 to a function that is different than the function in the scenario 600a. Accordingly, different behaviors can be associated with the hinge gesture 302 based on how quickly or slowly the hinge 108 is moved. Generally, the velocities 602, 608 can be measured in various ways, such as in radians per second, angles per second, and so forth.

Figure 7:
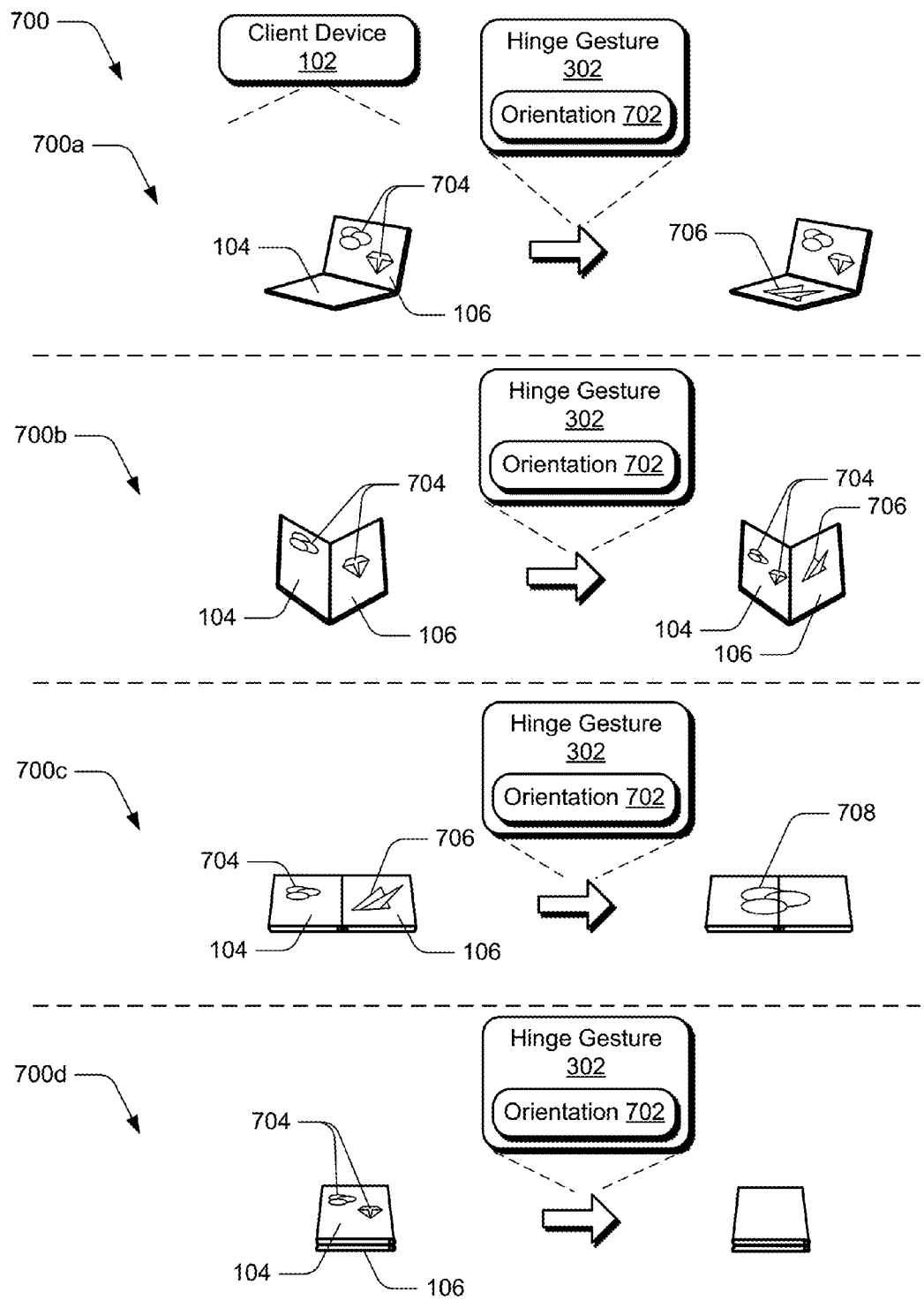
FIG. 7 depicts example implementation scenarios for a multimodal combination of a hinge interaction with an additional input modality in accordance with one or more embodiments.

FIG. 7 depicts example implementation scenarios 700 for a multimodal combination of a hinge interaction with an additional input modality in accordance with one or more embodiments. In the scenarios 700, various different orientations or postures of the client device 102 are depicted that can be used as additional input to the hinge gesture 302. As discussed above, the client device 102 includes the sensors 130, such as accelerometers, that detect an orientation 702 and/or posture of the client device 102 with respect to a user and/or the environment.

In example scenario 700a, the client device 102 is positioned in a "laptop" orientation with the first display device 104 lying flat and the second display device 106 positioned upright to provide a landscape view of content 704 displayed via the display device 106, similar to a traditional laptop display. In the scenario 700a, the first display device 104 is not currently displaying any content. In one example, when the hinge gesture 302 is performed, data representing the orientation 702 is combined with the hinge gesture 302, and a new user interface having content 706 can be launched via the first display device 104. As discussed above, the new content 706 can be contextually related to the content 704, or the new content 706 can include content that is unrelated to the content 704 displayed via the second display device 106.

Scenario 700b depicts the client device 102 positioned in a bent orientation, similar to an analog book, with content 704 displayed in a portrait view via both display devices 104, 106. When the hinge gesture 302 is performed, data representing the orientation 702 is combined with the hinge gesture 302. This combination can result in the content 704 being resized and/or repositioned to fit on the first display device 104 and a new user interface having the content 706 being launched via the second display device 106.

Scenario 700c depicts the client device 102 positioned in a flat orientation, displaying the content 704 via display device 104, and the content 706 via display device 106, respectively. The scenario 700c can represent a multitasking mode of the client device 102 with content 704 correlating to a first application and content 706 correlating to a second application that is not directly related to the first application. Combining data representing the orientation 702 with the hinge gesture 302 can cause the client device 102 to transition from the multitasking mode to a single-tasking mode where content 704 from the first application is displayed via both display devices 104, 106. In addition, the content 706 from the second application is removed from view. In at least one implementation, the content 704 can be resized and/or repositioned to fit to the enlarged display area to provide enlarged content 708. Alternatively, the content 706 from the second application can remain displayed while the content 704 is removed from view.

In scenario 700d, the client device 102 is positioned in a fully open configuration having the display devices 104, 106 facing substantially opposite directions, such that the display devices 104, 106 are "back-to-back". Here, the content 704 is displayed via the first display device 104. Additional content may or may not be displayed via the second display device 106. In at least one implementation, combining data representing the orientation 702 with the hinge gesture 302 can cause the client device 102 to turn off one or both of the display devices 104, 106. Alternatively or additionally, the hinge gesture 302 combined with the orientation 702 can cause the client device 102 to power down, or instead launch a different application such as a previously open application. Accordingly, a variety of different orientations 702 can be detected and orientation information can be combined with the hinge gesture 302 to perform different functions.

Figure 8:
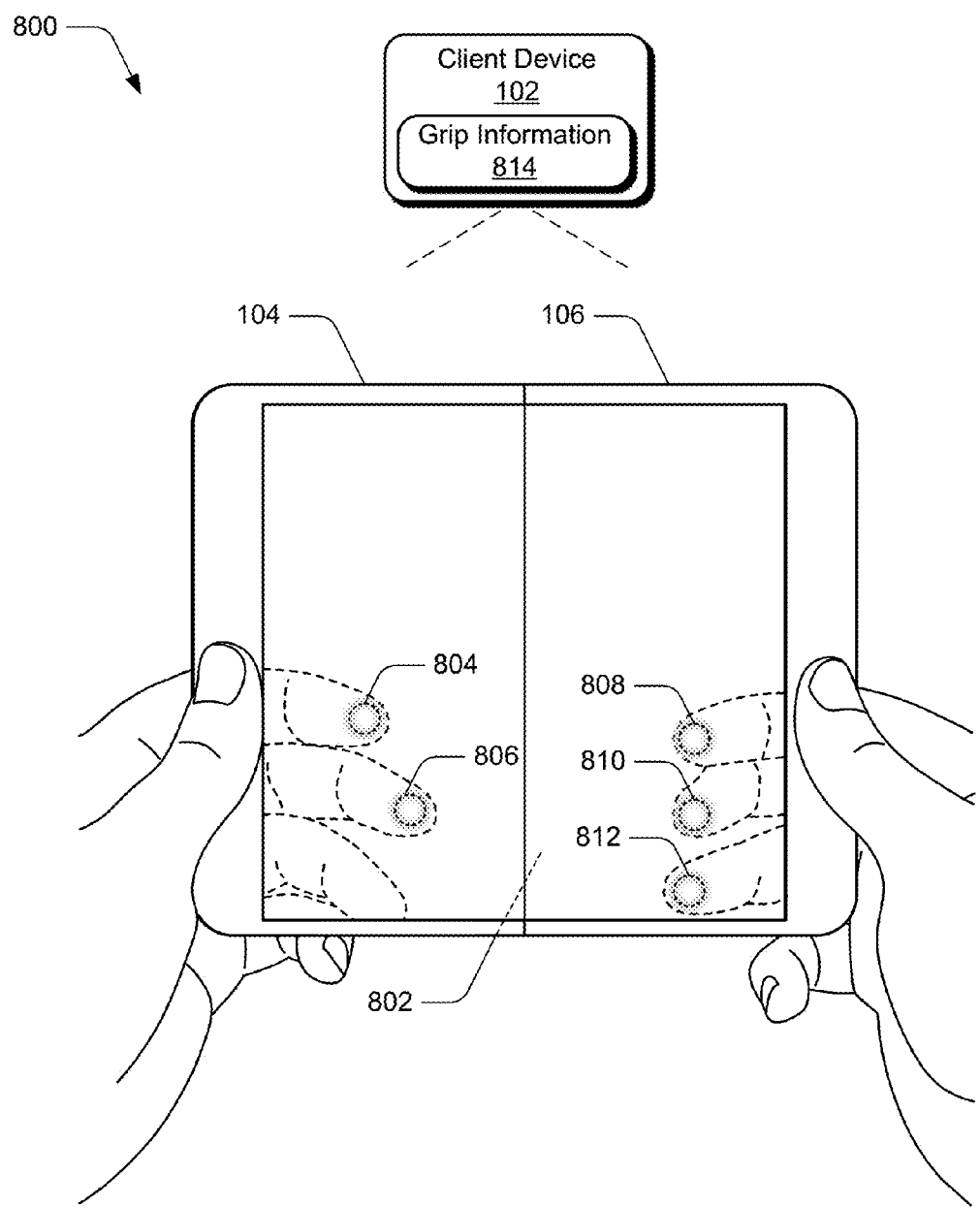
FIG. 8 depicts an example implementation scenario for a multimodal combination of a hinge interaction with an additional input modality in accordance with one or more embodiments.

FIG. 8 depicts an example implementation 800 for a multimodal combination of a hinge interaction with an additional input modality in accordance with one or more embodiments. For example, the client device 102 includes the sensors 130, such as dedicated grip sensors or other sensors configured to detect touch input via an exterior, such as a backside 802 (e.g., surface opposite one or more of the display devices 104, 106) of the client device 102. Alternatively, the client device 102 can include touch input surfaces, such as an additional touch screen or touchpad on the backside 802 of the client device 102. The sensors 130 are configured to detect when and how a user is holding the client device 102, such as by detecting touch locations on the backside 802 of the client device 102 and/or touch locations on the front side of the client device 102. Based on the manner in which the user is holding the client device 102 (e.g., particular number of fingers touching the client device 102, particular locations of the user's fingers, and so on), the hinge gesture 302 can be modified, refined, and/or verified.

In an example implementation, the hinge gesture 302 can be mapped to different actions based on whether the user is gripping the client device 102 with two fingers touching the backside 802 versus four fingers touching the backside 802. If the user grips the client device 102 while performing a hinge gesture and touches a back left side with two fingers, representing by touch points 804, 806, and also touches a back right side of the client device 102 with three fingers, represented by touch points 808, 810, and 812, then the system can combine grip information 814 with the hinge gesture 302 to perform a particular action. However, by performing the same hinge gesture 302 with two fingers touching the back left side and only two fingers touching the back right side, the system can combine this different grip information 814 with the hinge gesture 302 to perform a different action. Accordingly, the grip information 814 can be used to modify the hinge gesture 302.

In another example implementation, the grip information 814 can be used to specify which of the display devices 104, 106 to use to launch a new application. For example, the user can grip the client device 102 and touch a location on the display device 104 while performing a hinge gesture to cause the system to launch the new application via the display device 104. Alternatively, the user can touch a location on the display device 106 while performing the same hinge gesture to cause the system to launch the new application via the display device 106. In one or more implementations, touching a particular location or user interface element on one of the display devices 104, 106 can be used to specify a region on the touched display device that is to be used to launch the new application, rather than the entire display device. Accordingly, the grip information 814 can be used to specify locations on the display devices 104, 106 for performing actions, such as displaying applications or user interface elements, mapped to the hinge gesture 302.

Verification

Additional input signals, such as discussed in relation to FIGS. 6-8, can also be used as verification techniques to disambiguate an intentional hinge gesture from other hinge movements that are not intended to be a hinge gesture. For example, if a velocity of a change in hinge angle is below a particular velocity value, the system can determine that the hinge gesture 302 is not intended but rather that the user is merely changing the orientation of the client device 102. In another example, using orientation 702 and grip information 814, the system can determine that the second display device 106 is facing away from the user such that the user cannot view the second display device 106, and that operations should be performed solely via the first display device 104 rather than via the second display device 106. In a further example, using the grip information 814 and the orientation 702 information, the system can infer that the user is in the process of putting the client device 102 away in their pocket and that is the reason the hinge angle 304 is changing. Any combination of hinge angle velocity, grip information 814, and/or orientation 702 from the sensors 130 can also be used to determine that the user is simply changing the posture of the client device 102 and is not intending to perform a hinge gesture 302. Accordingly, a wide variety of verification techniques can be implemented to verify the hinge gesture 302.

Feedback

Figure 9:
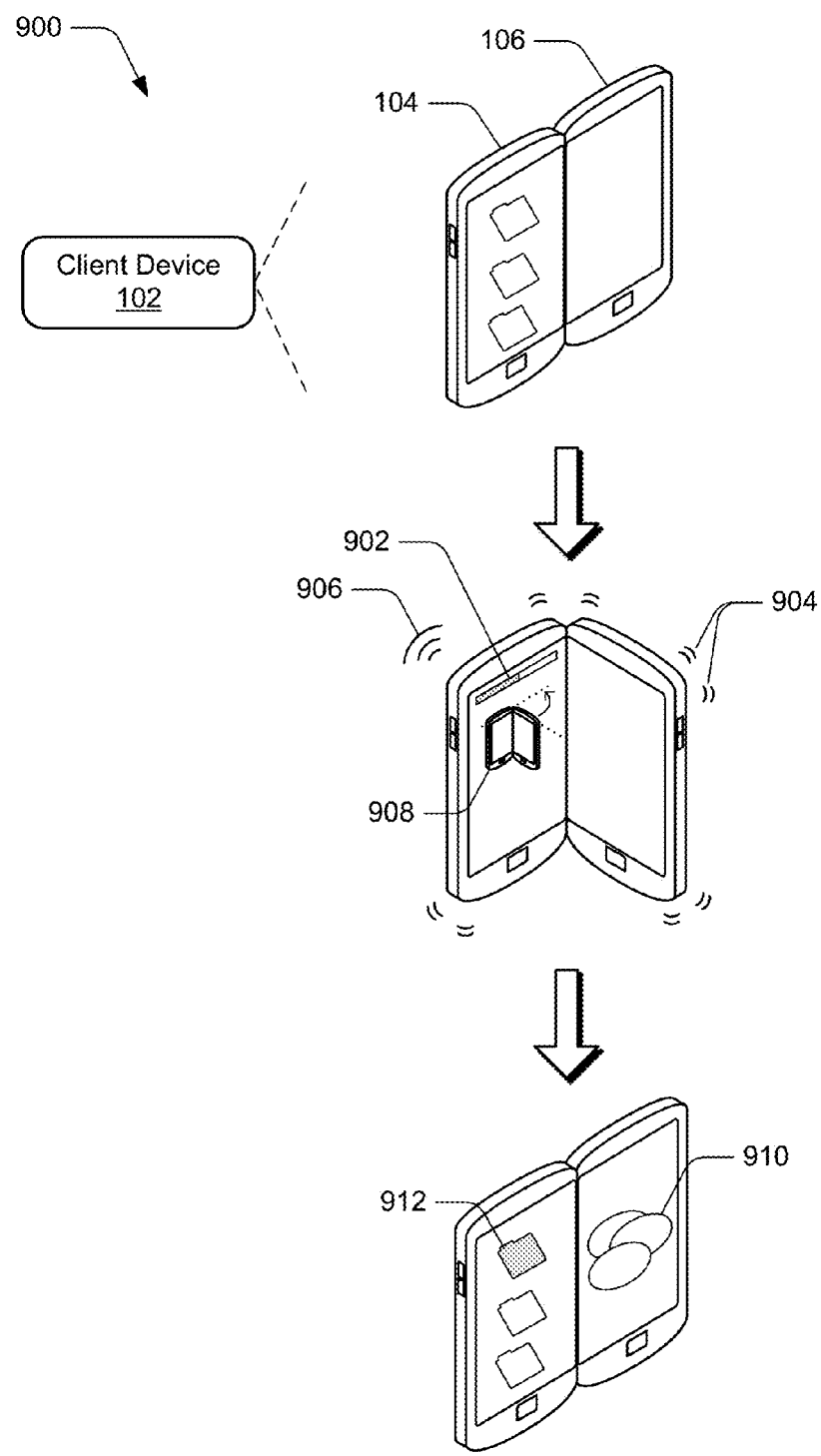
FIG. 9 depicts an example implementation scenario for feedback associated with hinge interactions in accordance with one or more embodiments

FIG. 9 depicts an example implementation scenario 900 for feedback associated with hinge interactions in accordance with one or more embodiments. The scenario 900 represents example feedback associated with performing a hinge gesture. For example, when progressing through performance of a hinge gesture via the client device 102, such as by performing a portion of a sequence of consecutive hinge angle changes, the system (e.g., the operating system 116) can detect progress along the hinge gesture together with information indicating how the user is performing the hinge gesture. During this time of progression through the hinge gesture, the system can provide one or more of real time visual feedback 902 via one or both display devices 104, 106, haptic feedback 904 through vibration of the client device 102, audio feedback 906 played back through speakers associated with the client device 102, and so on.

Feedback can inform the user on their progression along the gesture and give the user confidence that the gesture being performed is being recognized by the system. The feedback also indicates how far along the gesture the user has progressed. For example, if the hinge gesture represents manipulating the device from a flat state to a bent state having at least a twenty-degree hinge angle, then progress information can be displayed via one or both the display devices 104, 106. If the hinge angle has progressed from zero to ten degrees, then the user can see that the hinge gesture is half complete, and can also see how much more the device is to be bent in order to qualify as a valid hinge gesture.

Additional input signals (e.g., velocity 602, orientation 702, grip information 814) can be used to allow the user to perform more than one related hinge gesture, and the feedback can be used to inform the user of which action is to be performed if the user continues performing a current hinge gesture. For example, if the hinge gesture is based on velocity 602, then different feedback can be shown to reveal to the user which action is to be performed at the end of the hinge gesture based on whether the hinge gesture is performed slowly or quickly.

In the example scenario 900, the visual feedback 902 includes a progress bar that shows the progress of the hinge gesture as the hinge angle is being bent by different amounts. The progress bar can indicate that the gesture is currently 20% complete, 50% complete, 75% complete, and so on. Alternatively or in addition, an image 908 can be displayed to instruct the user as to how to complete the hinge gesture. For example, the image 908 illustrates a model of the device in the current bent state and includes arrows or other visual representation indicating how to complete the hinge gesture. In some implementations, the image 908 can include a video and/or animation showing the hinge gesture being performed from start to finish, or from a current position to a final position of the hinge gesture. Accordingly, a wide variety of visual feedback 902 can be displayed to provide additional information associated with the hinge gesture and to assist the user in understanding how to perform the hinge gesture.

Alternatively or additionally, haptic feedback 904 can be output to indicate to the user that the hinge gesture is being performed correctly or incorrectly, such as through different vibration patterns. For instance, the device can vibrate when the hinge gesture reaches certain milestones such as 50% complete. In another example, in an event that the hinge movement stops for a duration of time after partial completion of the hinge gesture, the device can vibrate to indicate that the opportunity of completing the sequence of hinge angle changes to perform the hinge gesture may soon expire. Accordingly, haptic feedback 904 can be used to provide a wide variety of information to the user in relation to performing the hinge gesture.

Audio feedback 906 can be used similarly to the haptic feedback 904 discussed above to provide information associated with the hinge gesture. The audio feedback 906 can include different audible tones and/or tonal patterns output via one or more speakers of the device.

In at least one implementation, if the user does not know how to correctly perform a particular hinge gesture because the user is not familiar with the device, then the feedback can be used as a teaching technique to reveal how far or how fast the gesture is to be performed in order to be correctly recognized by the system. Accordingly, feedback that relates to showing the user the progression along the gesture can be provided in an analog fashion while the gesture is being performed.

In response to the progression of the hinge gesture reaching 100% complete, the operation mapped to the hinge gesture is performed, examples of which are discussed above. In the example scenario 900, the client device 102 begins in a single-tasking state showing a list of folders via the display device 104, and a blank or powered-down display device 106. When the hinge gesture is performed, such as by bending the device to a bent state and then returning the device back to the flat state, the client device 102 transitions to a multitasking state that shows the list of folders via the display device 104, and also items 910 from a selected folder 912 in the list of folders.

Having described some example implementation scenarios, consider now some example procedures for input based on interactions with a physical hinge in accordance with one or more implementations.

Example Procedures

The following discussion describes example procedures for input based on interactions with a physical hinge in accordance with one or more implementations. The example procedures may be employed in the environment 100 of FIG. 1, the system 1300 of FIG. 13, and/or any other suitable environment. The procedures, for instance, represent procedures for implementing the example implementation scenarios discussed above. In at least some implementations, the steps described for the various procedures can be implemented automatically and independent of user interaction.

Figure 10:
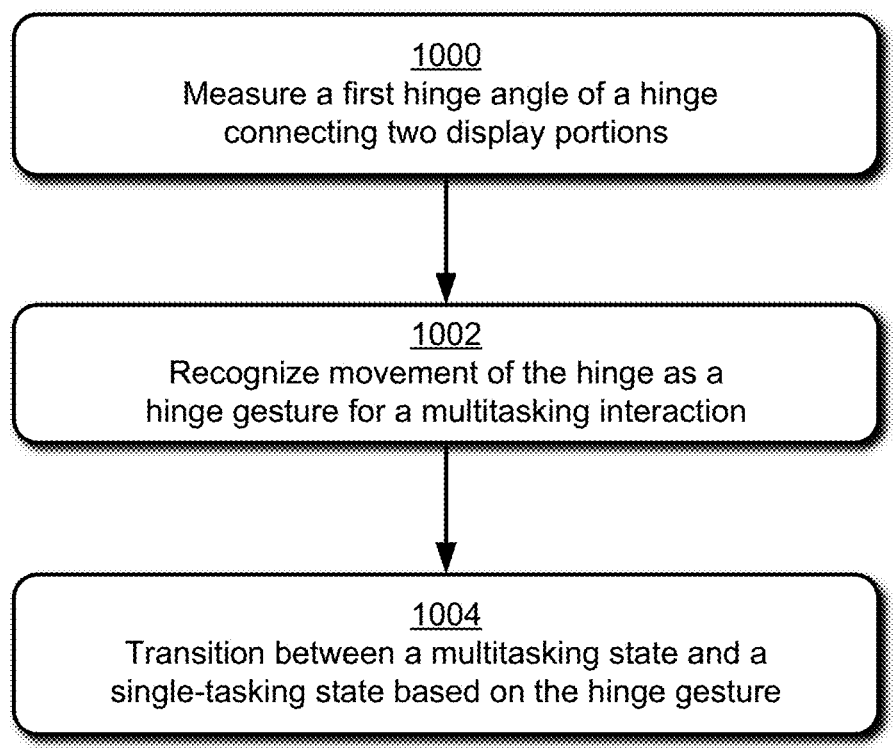
FIG. 10 is a flow diagram that describes steps in a method for recognizing a hinge gesture for a multitasking interaction in accordance with one or more embodiments.

FIG. 10 is a flow diagram that describes steps in a method for recognizing a hinge gesture for a multitasking interaction in accordance with one or more implementations. The method, for instance, describes an example procedure for input based on interactions with a physical hinge in accordance with one or more implementations.

Step 1000 measures a first hinge angle of a hinge connecting two display portions. The client device 102, for example, uses sensors 130 to measure a current angle formed between the two display devices 104, 106 of the client device 102 that are physically connected by the hinge 108.

Step 1002 recognizes movement of the hinge as a hinge gesture for a multitasking interaction. In at least some implementations, the movement of the hinge includes a sequence of multiple consecutive movements of the hinge that each change the angle of the hinge. The client device 102, for instance, recognizes the movement of the hinge globally at a system level rather than at an application level. Because the hinge gesture is recognized globally at the system level, the hinge gesture can be mapped to a multitasking interaction that is independent of a currently running application. Examples of multitasking interactions are described above.

Step 1004 transitions between a multitasking state and a single-tasking state based on the hinge gesture. In one or more implementations, the hinge gesture is mapped to an operation that transitions from a single-tasking state, where a single task is running on one or both of the display portions, to a multitasking state where a different task is running on each display portion. Alternatively, the hinge gesture can be mapped to an operation that transitions from the multitasking state to the single-tasking state. Examples of these transitions are described above in relation to scenarios 200 and 700.

Figure 11:
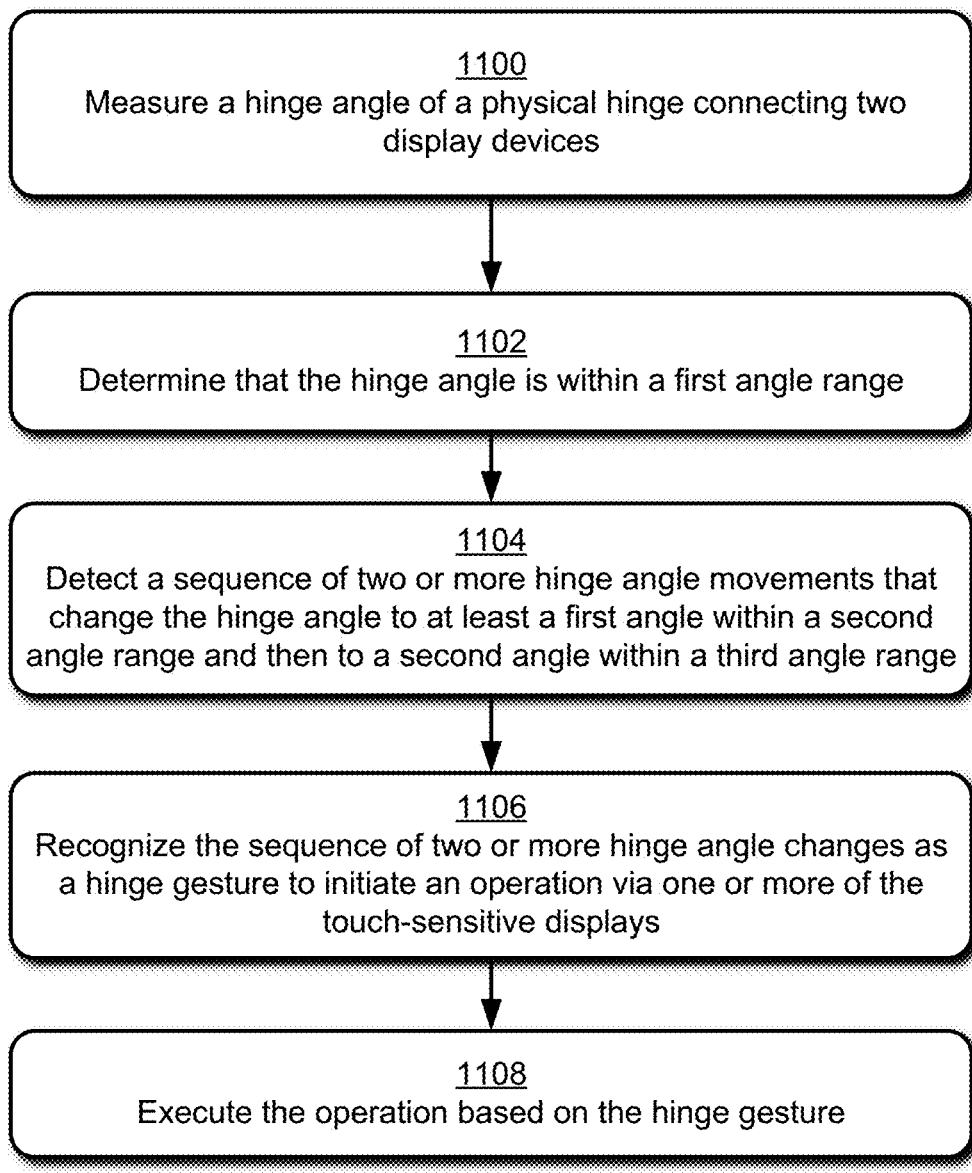
FIG. 11 is a flow diagram that describes steps in a method for recognizing interactions with a physical hinge as input to a device in accordance with one or more embodiments.

FIG. 11 is a flow diagram that describes steps in a method for recognizing interactions with a physical hinge as input to a device in accordance with one or more implementations. The method, for instance, describes an example procedure for input based on interactions with a physical hinge in accordance with one or more implementations.

Step 1100 measures a first hinge angle of a physical hinge connecting two display devices. The client device 102, for instance, measures a current angle of the hinge 108 in real time using sensors 130. The measured angle can be used as an initial angle for a hinge gesture that is to be performed.

Step 1102 determines that the first hinge angle is within a first angle range. In the scenario 400, for example, the hinge angle can be compared with various ranges 402*a-d* to determine which of the angle ranges 402*a-d* includes the measured hinge angle. In at least some implementations, each angle range 402*a-d* corresponds to a particular UI state.

Step 1104 detects a sequence of two or more hinge angle movements that change the first hinge angle to at least a second hinge angle within a second angle range and then to a third hinge angle within a third angle range. The client device 102 in the scenario 500, for instance, detects multiple consecutive hinge angle changes that occur within a predefined duration of time. Further, the changes to the hinge angle 304 are sufficient to form a new angle 504 that is within the angle range 402*b* which is different than the first angle range 402*c* in which the initial measured angle resides. The third angle range, however, can be the same range as the first angle range, such that the sequence of hinge angle movements includes a back-and-forth movement of the hinge 108, as in scenario 500 in FIG. 5. Alternatively, the third angle range can represent an angle range outside of the first angle range and the second angle range.

Step 1106 recognizes the sequence of two or more hinge angle changes as a hinge gesture to initiate an operation via one or more of the touch-sensitive displays. In at least some implementations, the sequence of hinge angle changes, if occurring within a predefined duration of time, are recognized as analog input that is mapped to a hinge gesture.

Step 1108 executes the operation based on the hinge gesture. The client device 102, for example, executes a system-level operation that is mapped to the hinge gesture. Examples of system-level operations include multitasking related commands and transitions, state transitions, user interface transitions and view changes, and so on.

Figure 12:
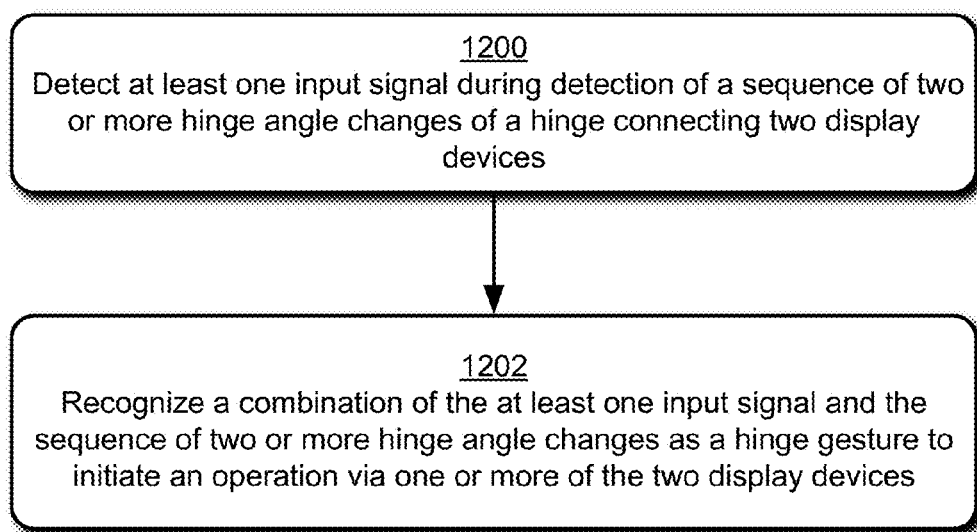
FIG. 12 is a flow diagram that describes steps in a method for multimodal combinations of a hinge interaction with additional input modality in accordance with one or more embodiments.

FIG. 12 is a flow diagram that describes steps in a method for recognizing a combination of interactions with a physical hinge and additional input signals as input to a device. The method, for instance, describes an example procedure for input based on interactions with a physical hinge in accordance with one or more implementations.

Step 1200 detects at least one input signal during detection of a sequence of two or more hinge angle changes of a hinge connecting two display devices. In at least some implementations, the input signal can include a velocity associated with movement of the hinge 108 during each of the hinge angle changes. In implementations, the input signal can include orientation 702 of the client device 102 relative to a user, and/or to a physical environment of the client device 102. The orientation 702 of the client device 102, for instance, can include an initial hinge angle of the hinge 108 as well as a position and/or posture of the client device 102. Alternatively or additionally, the input signal can include grip information 814 that describes how the user is holding the client device 102, such as a number and positioning of the user's fingers on the back and/or front of the client device 102. In at least some implementations, the at least one input signal can include a combination of any of the velocity 602, orientation 702, and/or grip information 814.

Step 1202 recognizes a combination of the at least one input signal and the sequence of two or more hinge angle changes as a hinge gesture to initiate an operation via one or more of the two display devices. In implementations, the input signal is used to cause the hinge gesture 302 to be mapped to a function that is different than if the hinge gesture 302 were recognized independent of (e.g., without) the input signal. Further, different input signals and/or different combinations of the input signals can modify the hinge gesture 302 by mapping the modified hinge gesture to different functions, examples of which are described above.

Having described some example procedures for input based on interactions with a physical hinge, consider now some further implementation details in accordance with one or more implementations.

Implementation Details

Generally, techniques for input based on interactions with a physical hinge described herein enable:

- Analog input control based on interactions with a physical hinge that connects two or more portions of a mobile device
- Use of an approximate hinge angle to switch between two or more discrete views of content or UI on one or more connected display screens, such as switching between different views of a dataset or showing/hiding chrome elements
- Extension to hinge gestures that are defined as a sequence of relative motions applied to the hinge or a sequence of state transitions among hinge angles (e.g., from 90 degrees to 180 degrees)
- Extension of multimodal interactions that incorporate the hinge angle as one of the constituent inputs (e.g., touching an object in the UI while bending the hinge to manipulate the object)
- Refinement of hinge angle sensor data used to enable the interactions with the physical hinge by using accelerometers placed in each side of the mobile device Accordingly, techniques described herein provide new ways for users to interact with devices that have multiple display devices connected by a physical hinge without conflicting with existing gesture input models. Additionally, the techniques described herein improve the user experience by extending the number and type of gesture inputs recognizable by these devices. These gesture inputs are recognized globally at the system level and thus allow various transitions between views of content or user interfaces without interrupting currently displayed content. Further, these additional gesture inputs can be used as shortcuts to perform a variety of operations that would otherwise require several navigational steps to initiate, thereby increasing efficiency and reducing the time used to navigate to and initiate various commands.

Having described some example implementation details, consider now a discussion of an example system and device in accordance with one or more implementations.

Example System and Device

Figure 13:
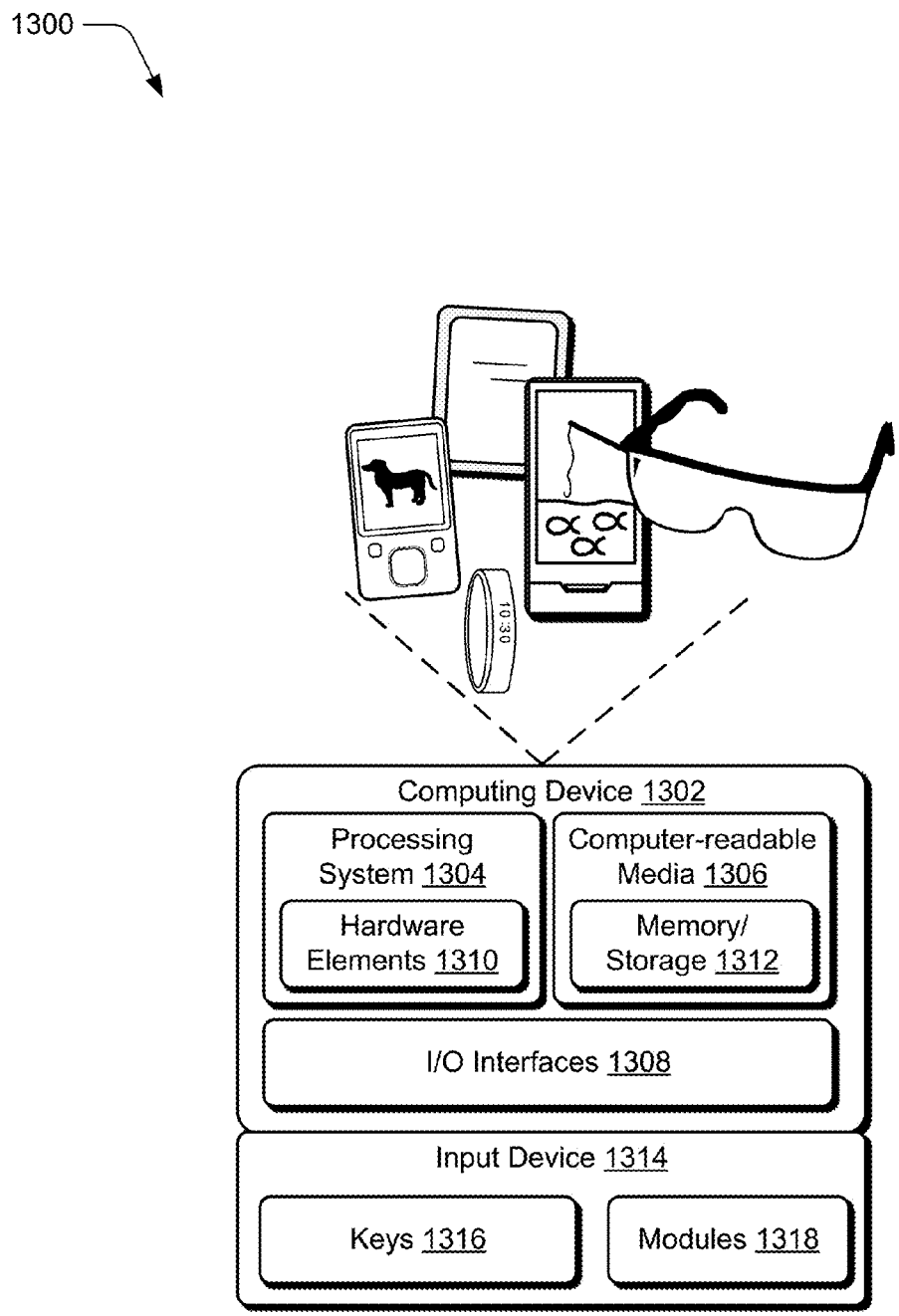
FIG. 13 illustrates an example system including various components of an example device that can be implemented as any type of computing device as described with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. In at least some implementations, the computing device 1302 represents an implementation of the client device 102 discussed above. The computing device 1302 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the client device 102 may be implemented as a wearable device, such as a smart watch, smart glasses, a dual-surface gesture-input peripheral for a computing device, and so forth.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways to support user interaction.

The computing device 1302 is further illustrated as being communicatively and physically coupled to an input device 1314 that is physically and communicatively removable from the computing device 1302. In this way, a variety of different input devices may be coupled to the computing device 1302 having a wide variety of configurations to support a wide variety of functionality. In this example, the input device 1314 includes one or more keys 1316, which may be configured as pressure sensitive keys, mechanically switched keys, and so forth.

The input device 1314 is further illustrated as include one or more modules 1318 that may be configured to support a variety of functionality. The one or more modules 1318, for instance, may be configured to process analog and/or digital signals received from the keys 1316 to determine whether a keystroke was intended, determine whether an input is indicative of resting pressure, support authentication of the input device 1314 for operation with the computing device 1302, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media and does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments A system to recognize interactions with a physical hinge as input to a computing device, the system: a device having two display portions physically connected to each other by a hinge; at least one processor; and at least one computer-readable storage media storing instructions that are executable by the at least one processor to implement a gesture module configured to: measure a first hinge angle of the hinge connecting the two display portions; recognize movement of the hinge as a hinge gesture for a multitasking interaction, the hinge movement including moving the hinge from the first hinge angle to a second hinge angle; and transition between a multitasking state and a single-tasking state based on the hinge gesture.

In addition to any of the above described systems, any one or combination of: wherein the multitasking state includes execution of multiple applications each displayed via a respective display portion of the two display portions; wherein the single-tasking state includes execution of a single application displayed via at least one of the two display portions; wherein the hinge gesture is a system-reserved gesture that is recognized globally at a system level; wherein the hinge movement additionally includes movement of the hinge from the second hinge angle to a third hinge angle that is within a range of angles that includes the first hinge angle, and wherein the hinge gesture is recognized as a combination of multiple hinge angle changes and is interpreted as a single gesture to perform an operation; wherein the transition includes a transition from the single-tasking state to a multitasking state by launching a previously running application, and wherein the currently running application and the previously running application are each displayed on a respective one of the two display portions.

A method implemented by a computing device for causing interactions with a physical hinge to be recognized as input to the computing device, the method comprising: measuring a first hinge angle of a physical hinge connecting two display devices; determining that the first hinge angle is within a first angle range; detecting a sequence of two or more hinge angle movements that change the first hinge angle to at least a second hinge angle within a second angle range and then to a third hinge angle within a third angle range; recognizing the sequence of two or more hinge angle changes as a hinge gesture to initiate an operation via at least one of the touch-sensitive displays; and executing the operation based on the hinge gesture.

In addition to any of the above described methods, any one or combination of: wherein the hinge gesture is recognized globally at a system level; wherein the third angle range is within the first angle range; wherein the third angle range is outside of the first angle range and outside of the second angle range; the method further comprising detecting at least one additional input signal during said detecting of the sequence of two or more hinge angle changes, the at least one additional input signal including a velocity associated with each of the two or more hinge angle changes, and recognizing the combination of the at least one additional input signal and the sequence of two or more hinge angle changes as the hinge gesture; the method further comprising detecting at least one additional input signal during said detecting of the sequence of two or more hinge angle changes, the at least one additional input signal including an orientation of the computing device, and recognizing the combination of the at least one additional input signal and the sequence of two or more hinge angle changes as the hinge gesture; the method further comprising detecting at least one additional input signal during said detecting of the sequence of two or more hinge angle changes, the at least one additional input signal including a touch input that indicates how a user is holding the computing device, and recognizing the combination of the at least one additional input signal and the sequence of two or more hinge angle changes as the hinge gesture; the method further comprising receiving at least one additional input signal during said detecting of the sequence of two or more hinge angle changes, the at least one additional input signal indicating at least one of velocity information associated with the hinge gesture, touch points on an exterior of the computing device indicating how a user is holding the computing device, or an orientation of the computing device with respect to gravity, and modifying the operation based on the at least one additional input signal; wherein the operation includes transitioning between a single-tasking state and a multitasking state; wherein the operation includes transitioning from a single-tasking state to a multitasking state, and wherein the multitasking state includes launching a previously running application.

A device to recognize interactions with a physical hinge as input to the device, the device: a hinge connecting two display devices; at least one sensor configured to measure a hinge angle of the hinge relative to the two display devices; and at last one processor configured to execute instructions stored in a memory to implement a gesture module configured to recognize a sequence of two or more consecutive changes to the hinge angle as a hinge gesture to perform an operation.

In addition to any of the above described devices, any one or combination of: the device further comprising at least one grip sensor configured to detect how a user is holding a housing of the device during the hinge gesture by detecting at least one touch point on an exterior surface that is opposite at least one of the two display devices, wherein the gesture module is further configured to modify the operation associated with the hinge gesture based on the at least one touch point; the device further comprising at least one additional sensor configured to detect an orientation of the device during the hinge gesture, wherein the gesture module is further configured to modify the operation associated with the hinge gesture based on the orientation of the device; the device further comprising at least one additional sensor configured to determine a velocity associated with the two or more consecutive changes to the hinge angle, wherein the gesture module is further configured to modify the operation associated with the hinge gesture based on the velocity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Conclusion

Techniques for a gesture language for a device with multiple touch surfaces are described. Although implementations are described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A system comprising:
   a device having two display portions physically connected to each other by a hinge;
   at least one processor; and
   at least one computer-readable storage media storing instructions that are executable by the at least one processor to implement a gesture module configured to:
     measure a first hinge angle of the hinge connecting the two display portions;
     recognize a hinge gesture that comprises a sequence of two or more consecutive changes to the hinge angle of the hinge, wherein the hinge gesture comprises movement of the hinge angle from a first angle range to a second angle range, that is different from the first angle range, and then to a third angle range that is different from the first angle range and the second angle range; and
     transition between a multitasking state and a single-tasking state based on the hinge gesture.

2. A system as described in claim 1, wherein the multitasking state includes execution of multiple applications each displayed via a respective display portion of the two display portions.

3. A system as described in claim 1, wherein the single-tasking state includes execution of a single application displayed via at least one of the two display portions.

4. A system as described in claim 1, wherein the hinge gesture is a system-reserved gesture that is recognized globally at a system level.

5. A system as described in claim 1, wherein the sequence of two or more consecutive changes to the hinge angle is recognized as a combination of multiple hinge angle changes and is interpreted as a single gesture to perform an operation.

6. A system as described in claim 1, wherein:
   the transition includes a transition from the single-tasking state to a multitasking state by launching a previously running application; and
   a currently running application and the previously running application are each displayed on a respective one of the two display portions.

7. A method implemented by a computing device, the method comprising:
   measuring a first hinge angle of a physical hinge connecting two display devices;
   determining that the first hinge angle is within a first angle range;
   detecting, within a threshold amount of time, a sequence of two or more hinge angle movements that change the first hinge angle to at least a second hinge angle within a second angle range, that is different from the first angle range, and then to a third hinge angle within a third angle range that is different from the first angle range and the second angle range;
   recognizing the sequence of two or more hinge angle changes as a hinge gesture to initiate an operation via the computing device; and
   executing the operation based on the hinge gesture.

8. A method as described in claim 7, wherein the hinge gesture is recognized globally at a system level.

9. A method as described in claim 7, further comprising detecting at least one additional input signal during said detecting of the sequence of two or more hinge angle changes, the at least one additional input signal including a velocity associated with each of the two or more hinge angle changes; and recognizing the combination of the at least one additional input signal and the sequence of two or more hinge angle changes as the hinge gesture.

10. A method as described in claim 7, further comprising:
detecting at least one additional input signal during said detecting of the sequence of two or more hinge angle changes, the at least one additional input signal including an orientation of the computing device; and
recognizing the combination of the at least one additional input signal and the sequence of two or more hinge angle changes as the hinge gesture.

11. A method as described in claim 7, further comprising:
detecting at least one additional input signal during said detecting of the sequence of two or more hinge angle changes, the at least one additional input signal including a touch input that indicates how a user is holding the computing device; and
recognizing the combination of the at least one additional input signal and the sequence of two or more hinge angle changes as the hinge gesture.

12. A method as described in claim 7, further comprising:
receiving at least one additional input signal during said detecting of the sequence of two or more hinge angle changes, the at least one additional input signal indicating at least one of velocity information associated with the hinge gesture, touch points on an exterior of the computing device indicating how a user is holding the computing device, or an orientation of the computing device with respect to gravity; and
modifying the operation based on the at least one additional input signal.

13. A method as described in claim 7, wherein the operation includes transitioning between a single-tasking state and a multitasking state.

14. A method as described in claim 7, wherein:
the operation includes transitioning from a single-tasking state to a multitasking state; and
the multitasking state includes launching a previously running application.

15. A method as described in claim 7, further comprising:
detecting at least one additional input signal during said detecting of the sequence of two or more hinge angle changes, wherein the at least one additional input signal indicating an orientation of a first display device, of the two display devices, relative to a second display device of the two display devices.

16. A method as described in claim 15, wherein the operation comprises changing, from a single-tasking state to a multitasking state based on a determination that the first display device and the second display device are oriented side-by-side.

17. A device comprising:
a hinge connecting two display devices;
at least one sensor configured to measure a hinge angle of the hinge relative to the two display devices; and
at last one processor configured to execute instructions stored in a memory to implement a gesture module configured to:
recognize a hinge gesture that comprises a sequence of two or more consecutive changes to the hinge angle including movement of the hinge angle from a first angle range to a second angle range, that is different from the first angle range, and then to a third angle range that is different from the first angle range and the second angle range, and
perform an operation based on recognition of the hinge gesture.

18. A device as described in claim 17, further comprising:
at least one grip sensor configured to detect how a user is holding a housing of the device during the hinge gesture by detecting at least one touch point on an exterior surface that is opposite at least one of the two display devices, wherein the gesture module is further configured to modify the operation associated with the hinge gesture based on the at least one touch point.

19. A device as described in claim 17, further comprising:
at least one additional sensor configured to detect an orientation of the device during the hinge gesture, wherein the gesture module is further configured to modify the operation associated with the hinge gesture based on the orientation of the device.

20. A device as described in claim 17, further comprising:
at least one additional sensor configured to determine a velocity associated with the two or more consecutive changes to the hinge angle, wherein the gesture module is further configured to modify the operation associated with the hinge gesture based on the velocity.

* * * * *